US007267320B2

(12) United States Patent
Lee

(10) Patent No.: US 7,267,320 B2
(45) Date of Patent: Sep. 11, 2007

(54) MOLD APPARATUS

(75) Inventor: Jong-won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 282 days.

(21) Appl. No.: 11/142,232

(22) Filed: Jun. 2, 2005

(65) Prior Publication Data

US 2005/0276875 A1    Dec. 15, 2005

(30) Foreign Application Priority Data

Jun. 11, 2004    (KR) ...................... 10-2004-0043218

(51) Int. Cl.
*B29C 45/78*    (2006.01)
(52) U.S. Cl. ................... 249/79; 425/143; 425/144; 425/547; 425/552
(58) Field of Classification Search ............... 425/143, 425/144, 547, 552; 149/79
See application file for complete search history.

(56) References Cited

U.S. PATENT DOCUMENTS

| | | | | |
|---|---|---|---|---|
| 4,390,485 A | * | 6/1983 | Yang | 425/552 |
| 4,496,131 A | * | 1/1985 | Yang | 425/548 |
| 4,902,454 A | | 2/1990 | Steinbichler et al. | |
| 5,055,025 A | * | 10/1991 | Muller | 425/547 |
| 5,653,907 A | * | 8/1997 | Kendall et al. | 249/79 |
| 6,276,656 B1 | * | 8/2001 | Baresich | 249/79 |
| 6,447,283 B1 | | 9/2002 | Gellert | |

FOREIGN PATENT DOCUMENTS

| | | |
|---|---|---|
| JP | 05-337997 | 12/1993 |
| JP | 6-31786 | 2/1994 |
| JP | 2001-9836 | 1/2001 |
| KR | 20-254879 | 11/2001 |
| KR | 20-0279300 | 6/2002 |
| KR | 20-317466 | 6/2003 |
| KR | 20-318611 | 6/2003 |
| KR | 10-2003-0064484 | 8/2003 |

OTHER PUBLICATIONS

International Search Report issued on Aug. 24, 2005, for PCT/KR2005/001514.

* cited by examiner

*Primary Examiner*—Tim Heitbrink
(74) *Attorney, Agent, or Firm*—Stanzione & Kim, LLP

(57) ABSTRACT

A mold apparatus having at least a pair of molds formed with a cavity, at least one pipe accommodator formed in the molds, at least one heat pipe mounted in the pipe accommodator, a heat-cool source part connected to the heat pipe the heat and cool the heat pipe, and a controller to control the heat-cool source part to selectively heat and cool the heat pipe. Thus a mold apparatus to reduce a molding cycle and improve the quality of a molded product's appearance is provided.

18 Claims, 4 Drawing Sheets

MOLD APPARATUS

CROSS-REFERENCE TO RELATED APPLICATIONS

This application claims the benefit of Korean Patent Application No. 2004-0043218, filed Jun. 11, 2004, in the Korean Intellectual Property Office, the disclosure of which is incorporated herein by reference.

BACKGROUND OF THE INVENTION

1. Field of the Invention

The present general inventive concept relates to a mold apparatus, and more particularly, to a mold apparatus comprising an improved heating and cooling structure thereof.

2. Description of the Related Art

A mold apparatus for injection molding to inject melted resin will be described hereinbelow.

Generally, the mold apparatus for injection molding comprises a mold having a cavity formed with a space shaped to correspond to a desired product; a heating apparatus to heat the mold; and a cooling apparatus to cool the mold.

The heating apparatus in a conventional mold apparatus for injection molding comprises a heater, etc., mounted in the mold so as to heat the mold before the resin is injected into the cavity. The cooling apparatus comprises an apparatus circulating cold water in the mold so as to cool the mold after the resin is injected into the cavity.

However, in the conventional mold apparatus, the heating apparatus and the cooling apparatus are separately provided to heat and cool the mold by turns so that a heating term is increased due to the cooling apparatus, and a cooling term is increased due to the heating apparatus. Accordingly, the conventional mold apparatus has a problem that a molding cycle is extended. Also, in the case of lowering temperature of the mold so as to reduce the molding cycle, the mold apparatus has a difficulty in maintaining high-quality of the molded product's appearance. Accordingly, improvement of a structure of the mold apparatus is necessary so as to reduce the molding cycle and to make the quality of the molded product's appearance better.

SUMMARY OF THE INVENTION

Accordingly, it is an aspect of the present general inventive concept to provide a mold apparatus to reduce a molding cycle and improve the quality of a molded product's appearance.

Additional aspects and/or advantages of the general inventive concept will be set forth in part in the description which follows and, in part, will be obvious from the description, or may be learned by practice of the general inventive concept.

The foregoing and/or other aspects and advantages of the present general inventive concept are achieved by providing a mold apparatus comprising at least a pair of molds formed with a cavity; at least one pipe accommodator formed in the molds; at least one heat pipe mounted in the pipe accommodator; a heat-cool source part connected to the heat pipe, and heating and cooling the heat pipe; and a controller controlling the heat-cool source part to selectively heat and cool the heat pipe.

According to the present general inventive concept, the heat-cool source part may be in contact with a side of the heat pipe.

According to the present general inventive concept, the controller controls the heat-cool source part to be selectively supplied with a heat source and a cool source.

According to the present general inventive concept, the heat-cool source part comprises at least one pump supplying and discharging the heat source and the cool source.

According to the present general inventive concept, the heat-cool source part comprises a heat source part and a cool source part which are respectively coupled to the heat pipe.

According to the present general inventive concept, the pipe accommodator passes through the molds, and the heat source part and the cool source part are respectively in contact with opposite sides of the heat pipe passing through the pipe accommodator.

According to the present general inventive concept, the controller supplies the heat source to the heat source part and cuts off supplying of the cool source to the cool source part when the molds are heated, and the controller supplies the cool source to the cool source part and cuts off supplying of the heat source to the heat source part when the molds are cooled.

According to the present general inventive concept, the heat source comprises at least one of oil, water and steam, and the cool source comprises at least one of liquefied nitrogen gas, water and air.

According to the present general inventive concept, the heat-cool source part comprises a temperature sensor detecting temperature of the heat-cool source part.

According to the present general inventive concept, at least one mold is detachably provided, and the pipe accommodator is formed at a detaching surface of the mold to correspond to the shape of the cavity.

BRIEF DESCRIPTION OF THE DRAWINGS

These and other aspects and advantages of the general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
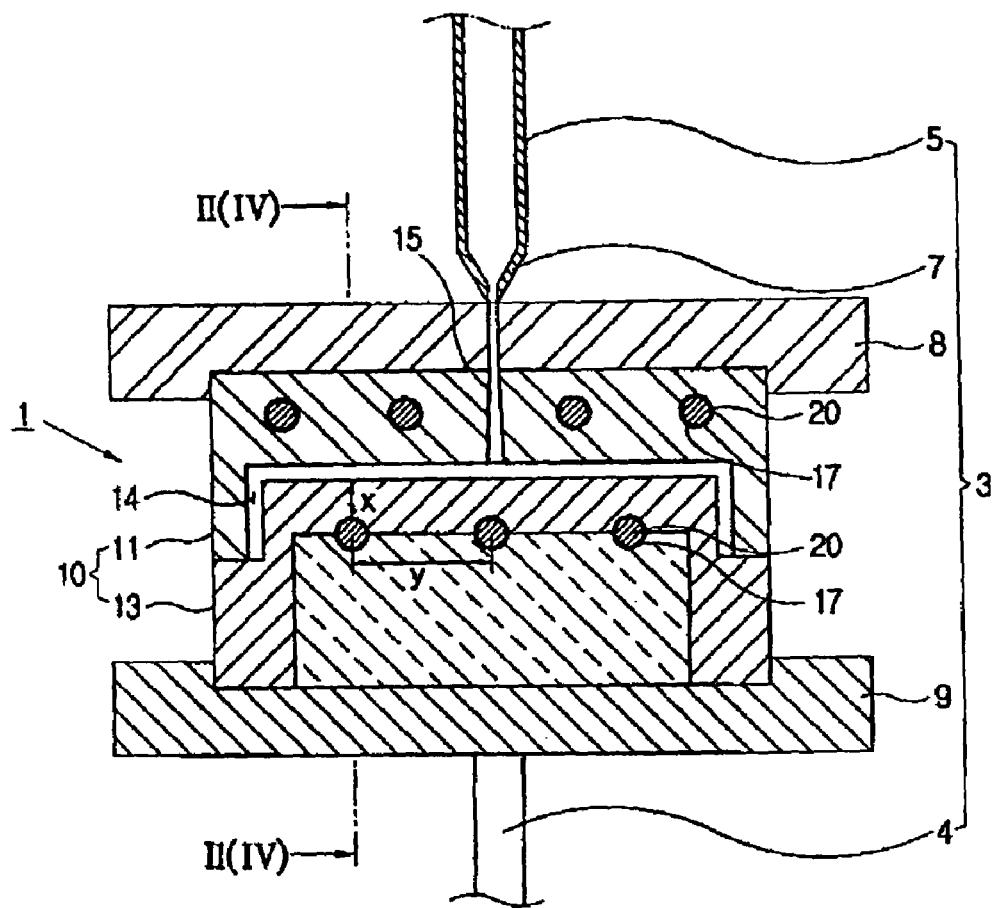
FIG. 1 is a schematic sectional view of a mold apparatus according to the present general inventive concept.

Reference will now be made in detail to the embodiments of the present general inventive concept, examples of which are illustrated in the accompanying drawings, wherein like reference numerals refer to like elements throughout. Like elements with a same configuration will be described throughout the figures, and repetition description will be avoided as necessary.

A mold apparatus for injection molding to inject melted resin as an example of the mold apparatus according to the present general inventive concept is described as follows while referring to the drawings.

Figure 2:
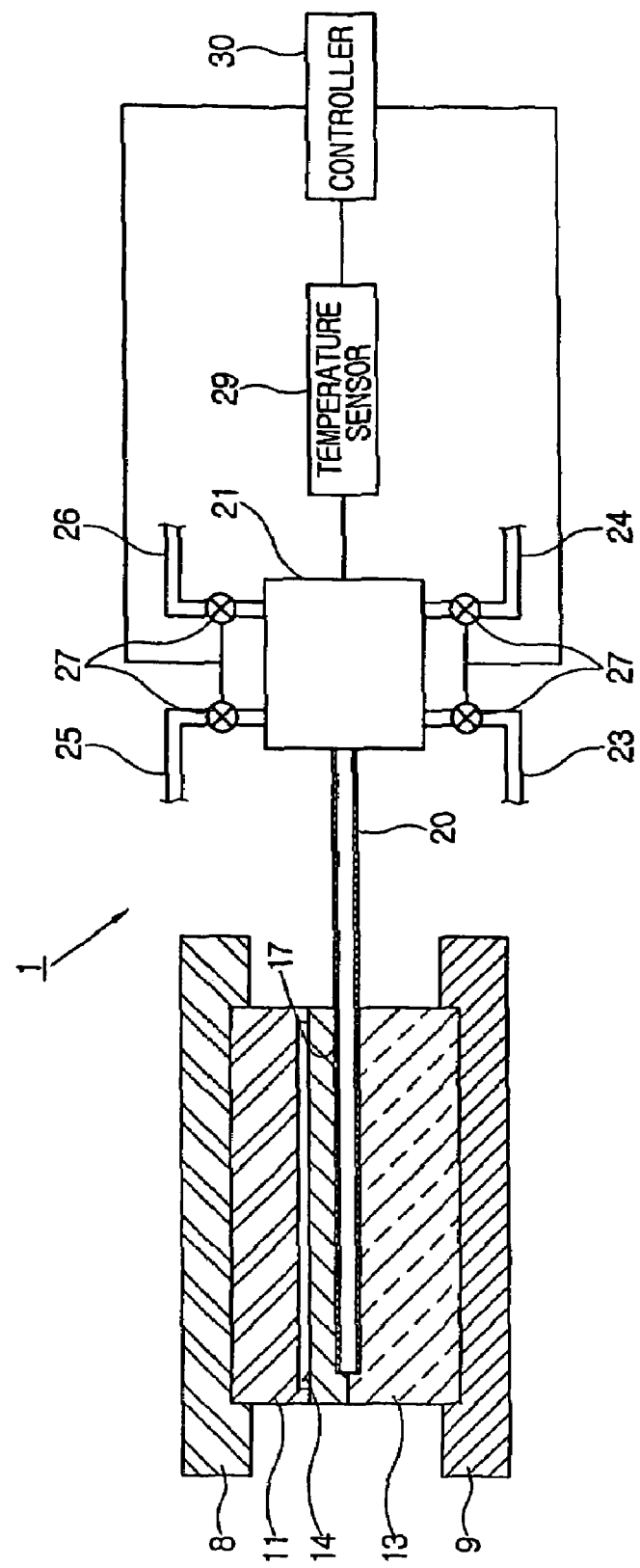
FIG. 2 is a sectional view of a mold apparatus, taken along line II-II of FIG. 1 and illustrating an embodiment of the present general inventive concept.
Figure 3:
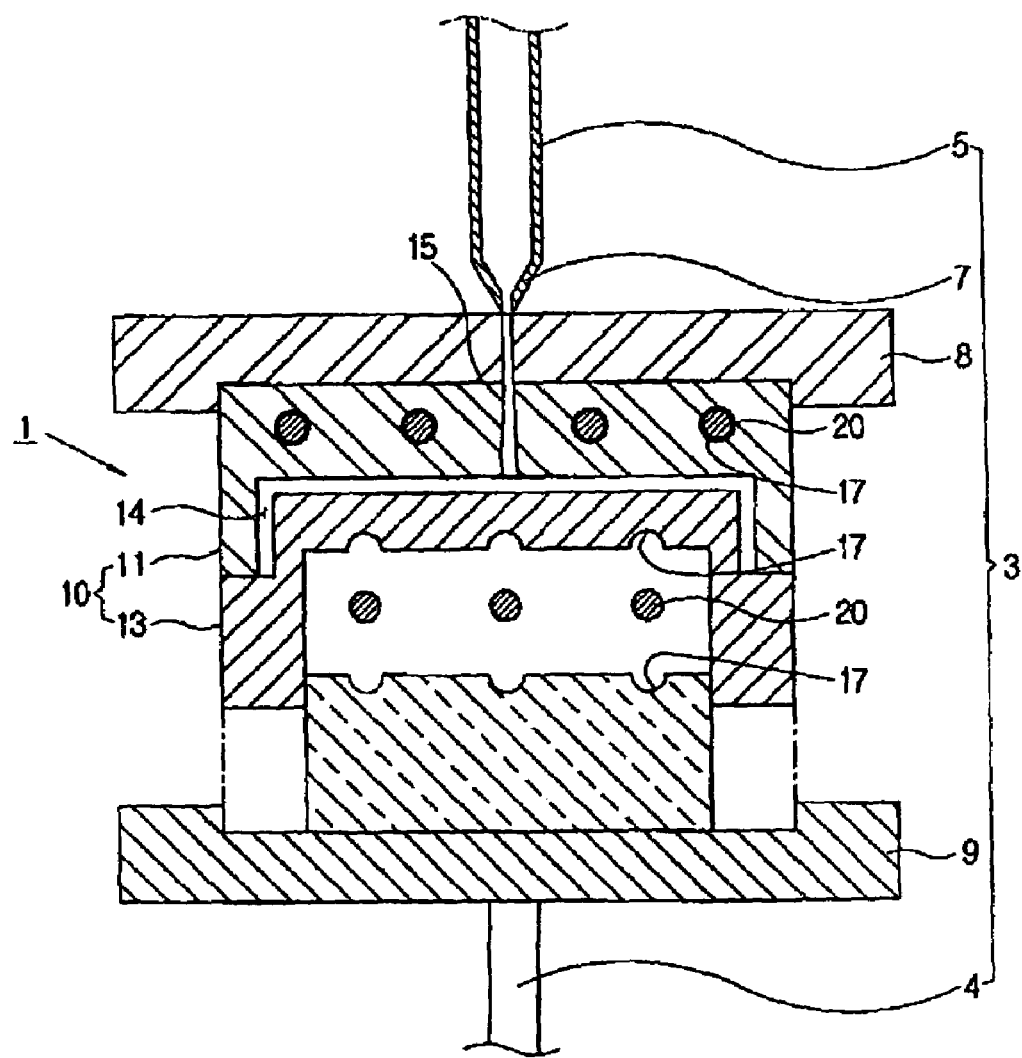
FIG. 3 is a partially exploded sectional view of a mold apparatus of FIG. 1 illustrating the embodiment of FIG. 2.

As shown in FIGS. 1 through 3, a mold apparatus 1 according to an embodiment of the present general inventive concept comprises at least a pair of molds 10 formed with a cavity 14 to mold a product; at least one pipe accommodator 17 formed in the molds 10; at least one heat pipe 20 mounted in the pipe accommodator 17; a heat-cool source part 21 connected to the heat pipe 20, and heating and cooling the heat pipe 20; and a controller 30 controlling the heat-cool source part 21 to selectively heat and cool the heat pipe 20.

The mold apparatus 1 according to the present general inventive concept is mounted at an injecting part 3 injecting resin, etc. into the cavity 14 of the molds 10 and operating the molds 10 so as to draw out a molded product.

The injecting part 3 comprises an injection cylinder 5 melting the resin and injecting melted resin into the cavity 14 of the molds 10, and an injecting nozzle 7 provided at an end of the injection cylinder 5. Also, the injecting part 3 comprises a fixed mold supporter 8 supporting a fixed mold 11 of the molds 10; a moving mold supporter 9 supporting a moving mold 13 of the molds 10; and a mold operator 4 coupled to the moving mold supporter 9 and moves the moving mold 13.

The resin used in the injecting part 3 can be made of, but not necessary made of plastics, and other types of resins widely used at an injection molding process can be also used.

The molds 10 connected to the injecting part 3 comprise the fixed mold 11 disposed at a side of the cavity 14, and the moving mold 13 disposed at an opposite side of the cavity 14 and movably provided by the mold operator 4 of the injecting part 3. Also, the molds 10 comprise a resin injecting hole 15 penetrating the injection nozzle 7 so as to inject the melted resin from the injecting part 3 into the cavity 14.

The cavity 14 is formed in a surface in which the fixed mold 11 and the moving mold 13 are coupled each other, and is shaped as a space to correspond to a predetermined product.

The fixed mold 11 comprises the resin injecting hole 15 which passes through the fixed mold 11 and the injection nozzle 7 of the injecting part 3, and the resin injecting hole 15 is connected to the cavity 14 and guides the resin into the cavity 14.

The moving mold 13 is coupled to the fixed mold 11, and is formed with the cavity 14 shaped to correspond to the product. Also, the moving mold 13 is detachably coupled to the fixed mold 11 because the moving mold 13 can move by being coupled to the mold operator 4.

The pipe accommodator 17 is disposed in at least one of the fixed mold 11 and the moving mold 13, and accommodates the heat pipe 20. The pipe accommodator 17 can be closely disposed to the heat pipe 20 so as to transmit heat well thereto, but is not limited to this position, and can be located at any position which allows the pipe accommodator 17 to perform its intended purpose described herein. A heat transmitting material such as lubricating oil may be also inserted between the pipe accommodator 17 and the heat pipe 20 so as to easily transmit the heat between the pipe accommodator 17 and the heat pipe 20. The pipe accommodator 17 may have such a diameter that the heat pipe 20 of approximately 3~12 mm diameter can be accommodated therein. However, the pipe accommodator 17 may have such a diameter that the heat pipe 20 of lager or smaller than 3~12 mm diameter can be accommodated therein. The pipe accommodator 17 does not penetrate the molds 10. That is, the heat pipe 20 is at an end thereof inserted into the pipe accommodator 17 so as not to penetrate the molds 10.

Also, the pipe accommodator 17 may be separated by a predetermined distance X from the cavity 14. The predetermined distance X between the pipe accommodator 17 and the surface of the cavity 14 may be approximately twice as long as the diameter of the pipe accommodator 17. However, the predetermined distance X between the pipe accommodator 17 and the surface of the cavity 14 may be longer or shorter than twice as the length of the diameter of the pipe accommodator 17.

Also, the pipe accommodator 17 may be plural in number, and the plurality of pipe accommodators 17 can be respectively separated by a predetermined distance from the fixed mold 11 and the moving mold 13 so as to quickly heat or cool the molds 10. A predetermined distance Y between the pipe accommodators 17 formed in the fixed mold 11 and the moving mold 13 may be approximately 2~5 times as long as the diameters of the pipe accommodators 17. However, the predetermined distance Y between the pipe accommodators 17 can be longer or shorter than 2~5 times as long as the diameters of the pipe accommodators 17.

Also, the pipe accommodator 17 is usually formed in the molds 10 through a drill process. However, the pipe accommodator 17 may be formed in the molds 10 through other processes such as milling. At least one of the fixed mold 11 and the moving mold 13 is detachably formed, and the plurality of pipe accommodators 17 may be formed along a separated surface of the fixed mold 11 and/or the moving mold 13. In other words, as shown in FIG. 3, the plurality of the pipe accommodators 17 are processed in the detaching surface of the molds 10 after detaching the molds 10 so that the plurality of pipe accommodators 17 are positioned to correspond to the shape of the cavity 14 and respectively maintain the predetermined distance X with respect to the surface of the cavity 14. In a case that the pipe accommodator 17 is formed at the detaching surface of the molds 10, the pipe accommodator 17 may have variable shapes compared with the pipe accommodator 17 of a straight shape formed by the drill process. Accordingly, the pipe accommodator 17 of variable shapes can be formed therein so that temperature of the surface of the cavity 14 can be accurately modulated and the quality of the molded product's appearance can be improved.

The heat pipe 20 may be plural in number and is capable of being inserted into the pipe accommodator 17. The heat pipe 20 is at a side thereof in contact with the heat-cool source part 21, and is at another side thereof coupled to the pipe accommodator 17 by being inserted therein. The heat pipe 20 is produced by such a process that liquid, such as water or alcohol, is inserted into a decompressed heat pipe and then opposite ends of the heat pipe 20 are sealed up. Material of the heat pipe 20 comprises metal with good heat conductivity. In other words, the heat pipe 20 can be made of copper, but alternatively may be of other materials with good heat conductivity. The diameter of the heat pipe 20 can be approximately 3~12 mm, but may be larger or smaller than 3~12 mm.

The heat-cool source part 21 is in contact with a side of the heat pipe 20. The heat-cool source part 21 is selectively supplied with the heat source and the cool source by the controller 30. Specifically, the heat-cool source part 21 is connected to a heat supplying pipe 23 to supply the heat source thereto and a heat discharging pipe 24 to discharge the heat source therefrom. Also, the heat-cool source part 21 is connected to a cool supplying pipe 25 to supply the cool source thereto and a cool discharging pipe 26 to discharge the cool source. Discharging pipes 24 and 26 and supplying pipes 23 and 25 can include valves 27 controlled by the controller 30. The valves 27 may be used specifically for opening and closing, or may also be used to modulate the amount of fluid flow. The heat-cool source part 21 may comprise at least one pump (not shown) supplying and discharging the heat source and the cool source. The discharging pipes 24 and 26 and the supplying pipes 23 and 25 can be connected to the pump so that the heat source and the cool source are supplied to the heat-cool source part 21 and discharged therefrom. The heat-cool source part 21 may comprise a heat-cool source part temperature sensor 29 to detect temperature of the heat-cool source part 21.

The heat source is supplied to the heat-cool source part 21 and heats the heat pipe 20 by being connected to the heat pipe 20. The temperature of the heat source may be approximately 60~290° C., but the temperature of the heat source may be higher or lower than 60~290° C. according to the types of the resin used for injection or the type of molds 10. For example, in the case of thermoplastic resin used for injection, when the melted resin is injected into the molds 10, the temperature of the molds 10 may be approximately from 60° C. lower to 40° C. higher than the temperature of the resin just before being drawn out therefrom. Accordingly, the heat pipe 20 heated by the heat source can quickly heat the molds 10. The heat source may include at least one of oil, water and steam, but can be other materials which can quickly heat the heat pipe 20.

The cool source is supplied to the heat-cool source part 21, which transfers the cool source to the heat pipe 20 so that the cool source cools the heat pipe 20. The temperature of the cool source may be approximately 0~40° C., but the temperature of the cool source may be higher or lower than 0~40° C. according to the types of the resin used for injection or the type of molds 10. Accordingly, the heat pipe 20 cooled by the cool source quickly cools the molds 10. The cool source may include at least one of liquefied nitrogen gas, water and air, but may be other materials which can quickly cool the heat pipe 20.

The controller 30 selectively supplies the heat source and the cool source to the heat-cool source part 21 by being connected to the valves 27 to control the valves 27 so that the controller 30 may control a supplying amount, a supplying time, a discharging amount, and a discharging time, etc. of the heat source and the cool source. The controller 30 is connected to a heat-cool source part temperature sensor 29 so that the controller 30 may control the supplying amount, the supplying time, the discharging amount, and the discharging time, etc., of the heat source and the cool source based on the temperature of the heat-cool source part 21. The controller 30 is connected to a mold temperature detecting sensor (not shown) to detect the temperature of the molds 10 so that the controller 30 may control the supplying amount, the supplying time, the discharging amount, and the discharging time, etc., of the heat source and the cool source based on the temperature of the heat-cool source part 21.

With this configuration, heating and cooling processes of the mold apparatus according to this embodiment of the present general inventive concept are performed as follows.

First, the molds 10 are coupled to each other for injection molding. The controller 30 heats the heat pipe 20 by supplying the heat source to the heat-cool source part 21. Then, the molds 10 are heated through the heated heat pipe 20. When the molds 10 are heated at a predetermined temperature, the melted resin from the injecting part 3 is inserted into the cavity 14 formed in the molds 10. When the inserting of the resin is finished or is almost finished, the controller 30 discharges the heat source from the heat-cool source part 21, and supplies the cool source thereto. Then, the heat pipe 20 is cooled by the cool source, and the molds 10 are cooled through a cooled heat pipe 20. Then the molds 10 are detached from each other and the molded product is drawn out.

Because the mold apparatus according to the present embodiment comprises the heat pipe 20 employed to sequentially heat and cool the molds 10, a cooling affect is minimized in the heating state, and the effect of the heating is minimized in the cooling state. Accordingly, the efficiency of heating and cooling is improved, and the mold apparatus 1 may quickly heat and cool the molds 10 so that a cycle of the injection molding is reduced. Because the molds 10 are quickly heated, the cycle of the injection molding is reduced and at the same time a weld mark is prevented from being formed in the appearance of the product, and transcription and glossiness of appearance of the product are improved, and a resin flow mark is prevented from being formed in the appearance of the product. Accordingly, the quality of the molded product's appearance can be improved.

Figure 4:
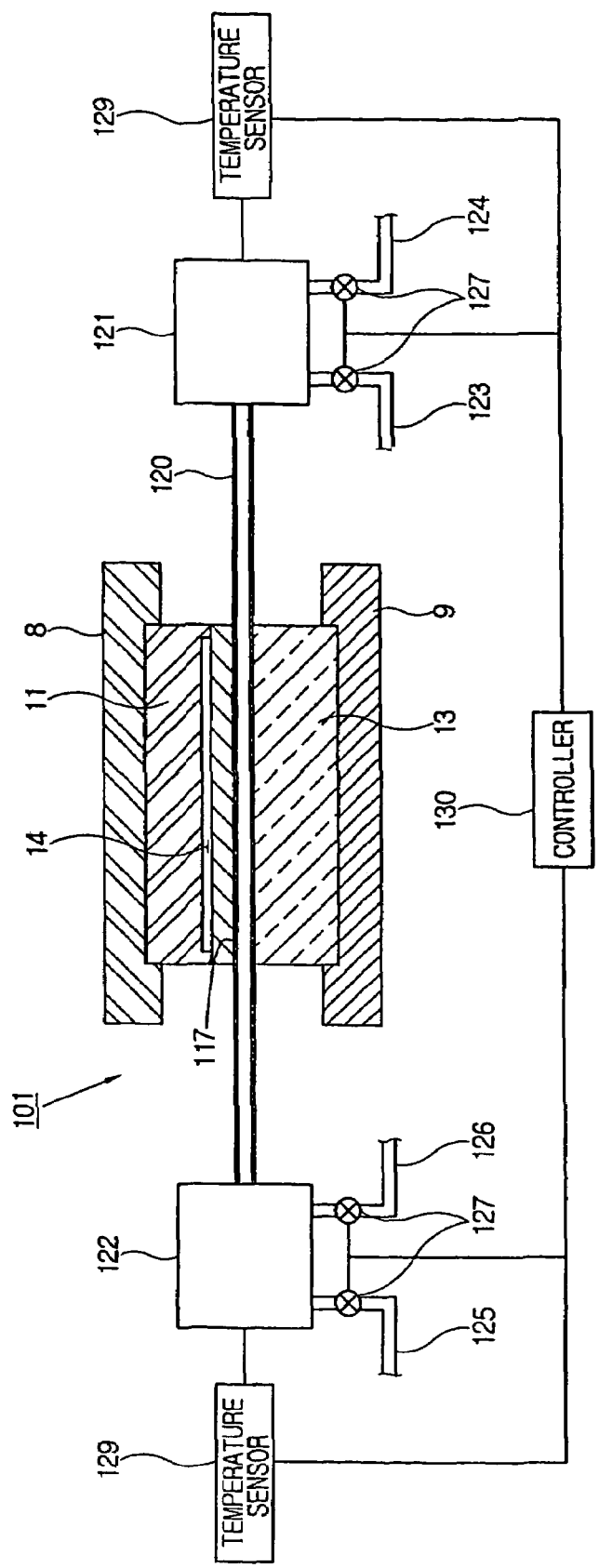
FIG. 4 is a sectional view of a mold apparatus, taken along line IV-IV of FIG. 1 illustrating another embodiment of the present general inventive concept.

FIG. 4 is a sectional view of a mold apparatus, taken along line IV-IV of FIG. 1 illustrating another embodiment of the present general inventive concept. As shown in FIG. 4, a mold apparatus 101 comprises a pair of heat-cool source parts 121 and 122 located along a heat pipe 120, which is different from the previous embodiment.

The heat-cool source parts 121 and 122 according to the present embodiment comprise a pair of a heat source part 121 and a cool source part 122 located along the heat pipe 120. A pipe accommodator 117 passes through molds 11 and 13 so that the heat pipe 120 may be inserted through the pipe accommodator 117 so as to pass through the molds 11 and 13.

The heat source part 121 and the cool source part 122 are respectively in contact with opposite sides of the heat pipe 120 passing through the pipe accommodator 117. The heat source part 121 is connected to a heat supplying pipe 123 supplying a heat source to the heat source part 121, and is connected to a heat discharging pipe 124 discharging the supplied heat source therefrom. Also, the cool source part 122 is connected to a cool supplying pipe 125 supplying a cool source thereto, and a cool discharging pipe 126 discharging the supplied cool source therefrom. Discharging pipes 124 and 126 and supplying pipes 123 and 125 can include valves 127 controlled by a controller 130. The valves 127 may be used specifically for opening and shutting, or may also be used to modulate the amount of fluid. The heat source part 121 and the cool source part 122 may respectively comprise at least one pump (not shown) supplying and discharging the heat source and the cool source. Specifically, the discharging pipes 124 and 126 and the supplying pipes 123 and 125 are connected to the pump so that the heat source and the cool source are supplied to and discharged from the heat source part 121 and the cool source part 122. The heat source part 121 and the cool source part 122 may respectively comprise heat-cool source part temperature sensors 129 to detect the temperature of the heat and cool source part, 121 and 122.

When the molds 11 and 13 are heated, the controller 130 supplies the heat source to the heat source part 121, and cuts off supplying of the cool source to the cool source part 122. When the molds 10 are cooled, the controller 130 supplies the cool source to the cool source part 122, and cuts off supplying of the heat source to the heat source part 121. Specifically, when the molds 11 and 13 are heated, the controller 130 controls the valves 127 to discharge the cool source from the cool source part 122, and to supply the heat source to the heat source part 121, and when the molds 10 are cooled, the controller 130 controls the valves 127 to discharge the heat source from the heat source part 121, and to supply the cool source to the cool source part 121 so that the heat pipe 120 is heated and cooled. Accordingly, the molds 11 and 130 are heated and cooled.

With this configuration, the mold apparatus according to the embodiment of FIG. 4 comprises the heat pipe 120 which is connected to the heat source part 121 and the cool source part 122, so that the mold apparatus 101 according to the present embodiment may heat and cool the molds 11 and 13 more effectively.

Also, the mold apparatus 101 according to FIG. 4 may reduce the cycle of the injection molding, and at the same time improve the quality of the molded product's appearance.

As described above, the heat-cool source part and the heat pipe are provided to heat the molds. However, it is possible that separated heaters are provided to quickly heat or partially heat the molds.

As described above, the mold apparatus provides injection molding. However, it is possible that the mold apparatus provides aluminum diecasting or heating and cooling other types of molds for injection molding.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A mold apparatus comprising:
   at least a pair of molds formed with a cavity;
   at least one pipe accommodator formed in the molds;
   at least one heat pipe mounted in the pipe accommodator;
   a heat-cool source part connected to the heat pipe, to heat and cool the heat pipe; and
   a controller to control the heat-cool source part to selectively heat and cool the heat pipe.

2. The mold apparatus according to 1, wherein the heat-cool source part may be connected to a side of the heat pipe.

3. The mold apparatus according to 2, wherein the controller controls the heat-cool source part to be selectively supplied with a heat source and a cool source.

4. The mold apparatus according to 3, wherein the heat-cool source part comprises at least one pump supplying and discharging the heat source and the cool source.

5. The mold apparatus according to 1, wherein the heat-cool source part comprises a heat source part and a cool source part respectively coupled to the heat pipe.

6. The mold apparatus according to 5, wherein the pipe accommodator passes through the molds, and the heat source part and the cool source part are respectively connected to opposite sides of the heat pipe passing through the pipe accommodator.

7. The mold apparatus according to 6, wherein the controller supplies the heat source to the heat source part and cuts off supplying of the cool source to the cool source part when the molds are heated, and the controller supplies the cool source to the cool source part and cuts off supplying of the heat source to the heat source part when the molds are cooled.

8. The mold apparatus according to 3, wherein the heat source comprises at least one of oil, water and steam, and the cool source comprises at least of one liquefied nitrogen gas, water and air.

9. The mold apparatus according to 1, wherein the heat-cool source part comprises a temperature sensor detecting temperature of the heat-cool source part.

10. The mold apparatus according to 1, wherein at least one mold is detachably provided, and the pipe accommodator is formed at a detaching surface of the mold to correspond to the shape of the cavity.

11. A mold apparatus comprising:
    a mold body having first and second mold parts in contact with each other and forming a cavity therebetween;
    at least one pipe accommodator formed in at least one of the first and second mold parts;
    a heat pipe accommodated in each of the pipe accommodators; and
    a heat-cool source member connected to each heat pipe to selectively provide a heat source and a cool source through the heat pipe to heat and cool the mold body.

12. The mold apparatus of claim 11, wherein the heat-cool source member comprises a controller to control the selectivity of providing the heat source and cool source to the heat pipe.

13. The mold apparatus of claim 11, wherein one of the first and second mold parts is a fixed mold and the other one of the first and second mold parts is a moving mold movable to be separated from the fixed mold.

14. The mold apparatus of claim 13, further comprising an injecting part to inject a melted resin into the mold body, the injecting part comprising a fixed mold supporter to support the fixed mold and a moving mold supporter to support the moving mold.

15. The mold apparatus of claim 12, wherein the heat-cool source member comprises a valve to modulate the amount of each of the heat source and the cool source.

16. The mold apparatus of claim 12, wherein the heat-cool source member further comprises a temperature sensor to sense a temperature of the heat-cool source part, and the controller controls the supply amount, supply time, discharging amount and discharging time of the heat source and cool source based on the temperature of the sensed and the cycle of a molding process.

17. The mold apparatus of claim 12, wherein the heat pipe extends through the mold body, and heat-cool source member comprises:
    a heat source member connected at one end of the heat pipe; and
    a cool source member connected at another end of the heat pipe.

18. The mold apparatus of claim 17, wherein each of the heat source member and the cool source member comprises a temperature sensor to sense a of the heat-cool source part, and the controller controls the supply amount, supply time, discharging amount and discharging time of the heat source and cool source based on the temperature of the sensed and the cycle of a molding process.

* * * * *